United States Patent
Klemen et al.

(10) Patent No.: US 7,402,923 B2
(45) Date of Patent: Jul. 22, 2008

(54) ELECTRICALLY VARIABLE TRANSMISSION

(75) Inventors: Donald Klemen, Carmel, IN (US); Ahmed M. El-Antably, Indianapolis, IN (US); Michael R. Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 187 days.

(21) Appl. No.: 10/902,472

(22) Filed: Jul. 29, 2004

(65) Prior Publication Data

US 2006/0025262 A1     Feb. 2, 2006

(51) Int. Cl.
*H02K 9/00*     (2006.01)
*B60K 11/02*    (2006.01)
*B60K 1/02*     (2006.01)

(52) U.S. Cl. .................. 310/54; 475/161; 310/58; 310/57; 310/89; 310/112; 180/339

(58) Field of Classification Search .............. 310/84, 310/54, 58; 180/339
See application file for complete search history.

(56) References Cited

U.S. PATENT DOCUMENTS

| | | | | |
|---|---|---|---|---|
| 2,192,654 A | * | 3/1940 | Simons | 417/415 |
| 2,462,451 A | * | 2/1949 | Winther | 310/54 |
| 3,054,007 A | * | 9/1962 | Munson | 310/105 |
| 3,531,668 A | * | 9/1970 | Cathey | 310/58 |
| 3,770,074 A | * | 11/1973 | Sherman | 180/65.6 |
| 4,423,344 A | * | 12/1983 | Jones | 310/105 |
| 5,014,800 A | * | 5/1991 | Kawamoto et al. | 180/65.5 |
| 5,111,090 A | * | 5/1992 | Otake et al. | 310/54 |
| 5,156,579 A | * | 10/1992 | Wakuta et al. | 475/161 |
| 5,372,213 A | * | 12/1994 | Hasebe et al. | 180/65.6 |
| 5,472,059 A | * | 12/1995 | Schlosser et al. | 180/65.5 |
| 5,558,595 A | | 9/1996 | Schmidt et al. | 477/3 |
| 5,627,420 A | * | 5/1997 | Rinker et al. | 310/87 |
| 5,931,757 A | * | 8/1999 | Schmidt | 475/2 |
| 6,358,173 B1 | * | 3/2002 | Klemen et al. | 475/5 |
| 6,478,705 B1 | | 11/2002 | Holmes et al. | 475/5 |
| 6,527,658 B2 | | 3/2003 | Holmes et al. | 475/5 |
| 6,579,202 B2 | * | 6/2003 | El-Antably et al. | 475/159 |
| 6,710,479 B2 | * | 3/2004 | Yoshida et al. | 310/52 |
| 6,743,135 B2 | * | 6/2004 | Klemen et al. | 475/5 |
| 2001/0024997 A1 | | 9/2001 | Sugano et al. | 477/72 |
| 2005/0151431 A1 | * | 7/2005 | Cronin et al. | 310/60 A |

* cited by examiner

*Primary Examiner*—Burton Mullins

(57) ABSTRACT

A transmission includes a housing, an electric motor having a stator within the housing, and a member including a generally cylindrical portion that circumscribes at least part of the stator. The member cooperates with the housing to form an annular coolant flowpath therebetween, and the member includes a plurality of holes to provide radial inflow of coolant from the flowpath to the stator to provide significantly improved motor cooling compared to the prior art.

9 Claims, 4 Drawing Sheets

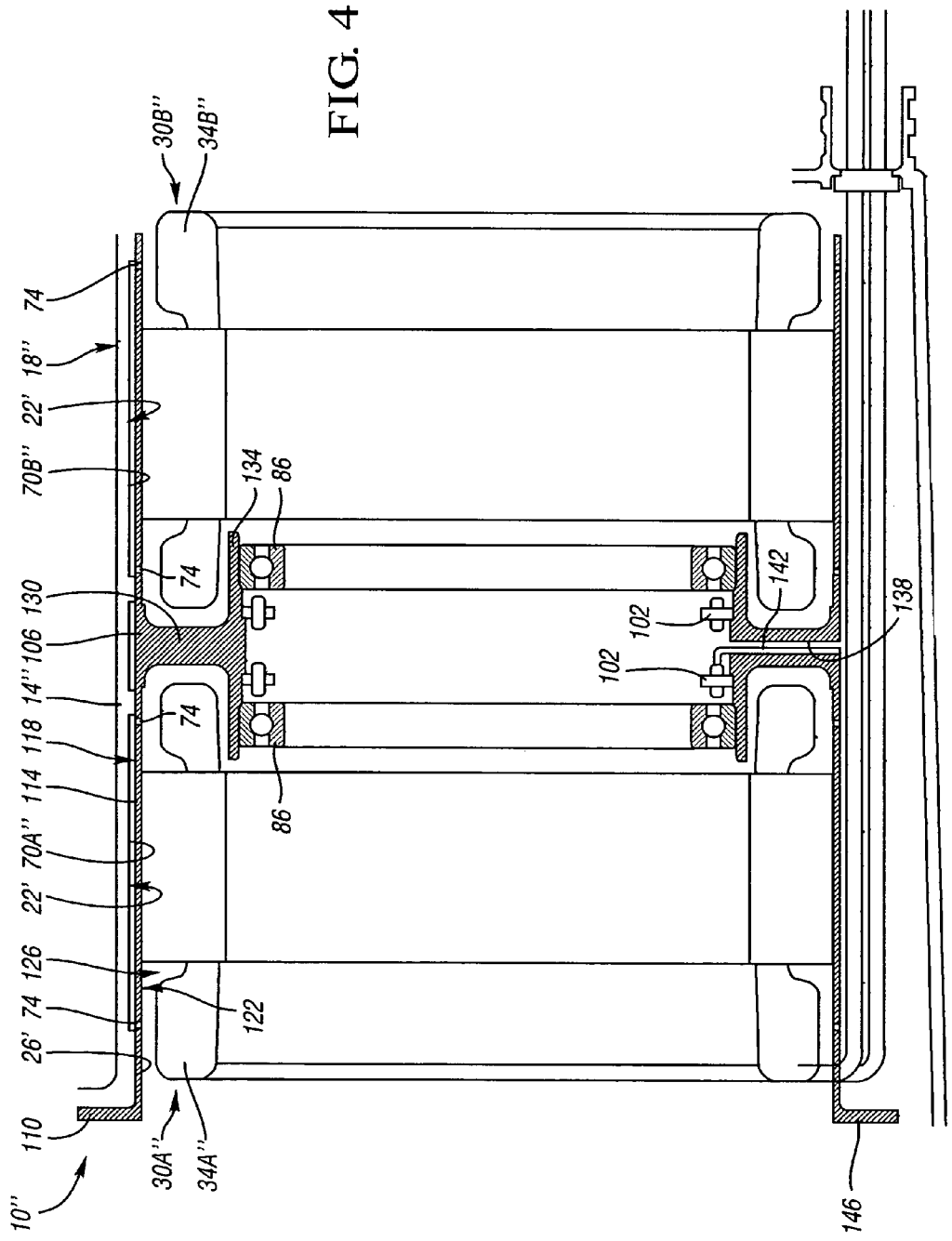

US 7,402,923 B2

ELECTRICALLY VARIABLE TRANSMISSION

TECHNICAL FIELD

This invention relates to transmissions that include at least one electric motor, a housing, and a member that at least partially circumscribes the motor and cooperates with the housing to form an annular flowpath.

BACKGROUND OF THE INVENTION

Electrically variable transmissions, such as those described in U.S. Pat. No. 5,931,757, employ two electric motors mounted inside a transmission housing. The electric motors are coaxially oriented with an input shaft, an output shaft, and two planetary gearsets. Each motor is operatively connected to a member of one of the planetary gearsets to provide a range or mode of transmission operation characterized by a continuously variable speed ratio between the input shaft and the output shaft.

The electric motors in electrically variable transmissions must have very precise location, low sensitivity of location to thermal events, and very uniform coolant flow. Thus, manufacturing tolerances for components, such as the housing, that interface with the motors are typically small and, accordingly, limit the manufacturing processes that may be employed.

SUMMARY OF THE INVENTION

An electrically variable transmission is provided. The transmission includes a transmission housing defining a generally cylindrical cavity. The transmission also includes an electric motor located within the cavity. The electric motor includes a generally ring-shaped stator and a rotor. The transmission also includes a member having a generally cylindrical portion that circumscribes at least a portion of the stator. The member and the housing define an annular coolant flowpath therebetween, and the member includes a plurality of holes formed therein so that coolant in the annular flowpath flows radially inward toward the stator windings to provide a concentric radial spray feature. Concentric radial spray of coolant provides superior cooling of the stator windings compared to other methods available in the prior art, and therefore enables the motor to be smaller compared to the prior art.

In a preferred embodiment, the stator is mounted to the member rather than the housing, thus enabling larger manufacturing tolerances for the housing. The member thus enables the housing to be formed using manufacturing processes, such as die casting, suitable for high-volume production.

In a preferred embodiment, the transmission includes two motors mounted to the member to form a preassembled module for simplified assembly. The module enables insertion of the motors into the housing from one direction, and allows both of the stators, speed sensors, and wiring to be subassembled and tested prior to insertion into the housing. The module also provides ease of replacement during transmission servicing. The preassembled module enables a reduced transmission diameter compared to the prior art because the module, including both motors, may be fastened to the housing at the forward end and not at the rearward end, thus eliminating the rearward split-line.

The member is preferably steel to prevent thermal clearance changes, to allow standard clearance bearings, and to provide electromagnetic shielding for speed sensors, i.e., speed resolvers, that monitor rotor speed and the wires of speed sensors.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic cross-sectional side view of a portion of another alternative transmission configuration, including a transmission housing and a motor module operatively connected thereto.

DESCRIPTION OF THE PREFERRED EMBODIMENTS

Figure 1:
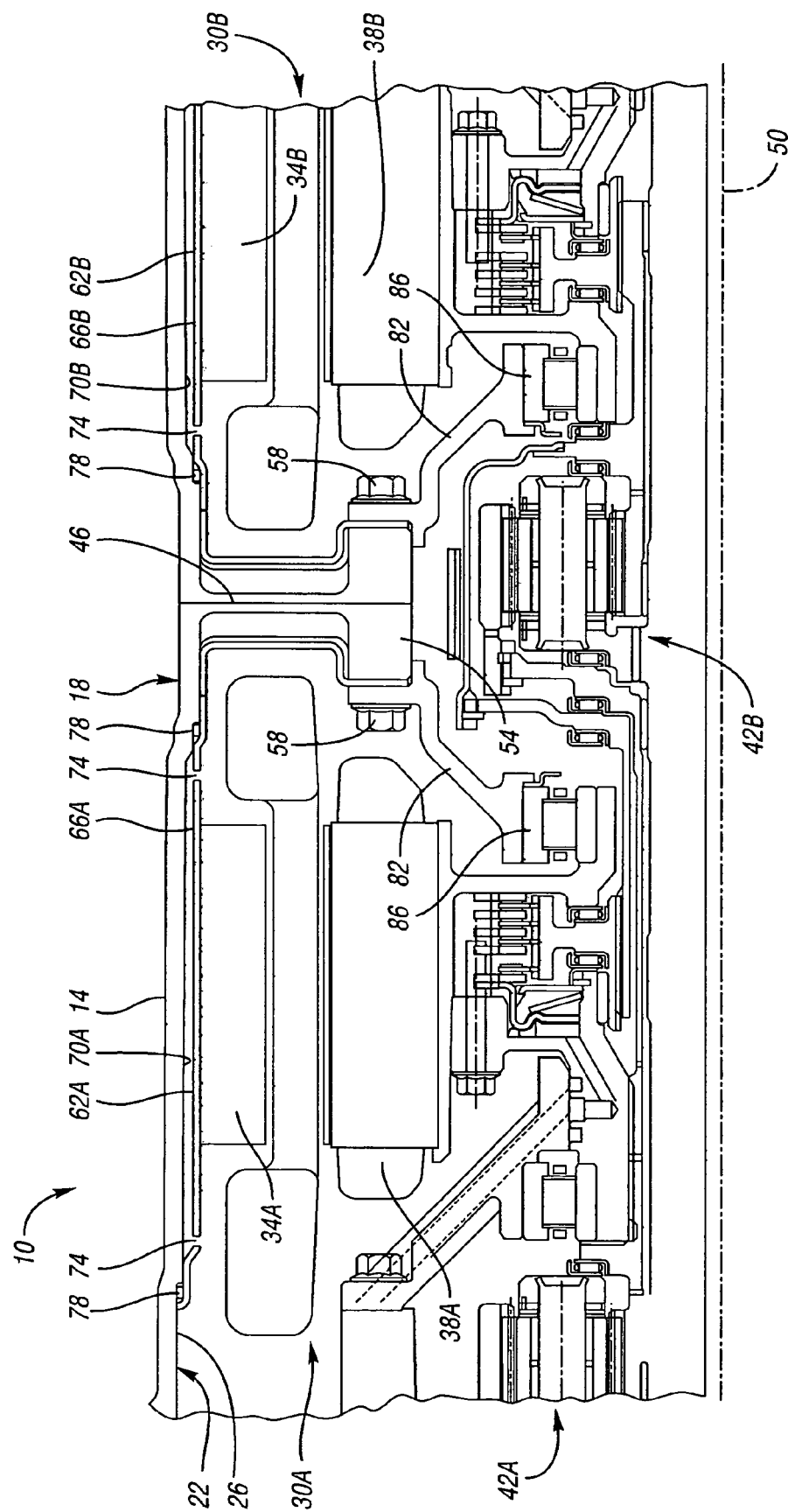
FIG. 1 is a schematic cross-sectional side view of a portion of an electrically variable transmission.

Referring to FIG. 1, a portion of an electrically variable transmission 10 is schematically depicted. Exemplary electrically variable transmissions are described in U.S. Pat. No. 5,558,595, issued Sep. 24, 1996 to Schmidt et al; U.S. Pat. No. 5,931,757, issued Aug. 3, 1999 to Schmidt; U.S. Pat. No. 6,478,705, issued Nov. 12, 2002 to Holmes et al; and U.S. Pat. No. 6,527,658, issued Mar. 4, 2003 to Holmes et al, each of which is hereby incorporated by reference in its entirety. The transmission 10 includes a housing 14 that defines the exterior surface 18 of the transmission. The housing 14 includes an inner surface 22 that defines a generally cylindrical cavity 26.

The transmission 10 also includes a first electric motor/generator 30A and a second electric motor/generator 30B. Each electric motor generator 30A, 30B includes a generally ring-shaped stator 34A, 34B fixed with respect to the housing 14, and a rotor 38A, 38B. The motors 30A, 30B are coaxially aligned with an input shaft (not shown) and a plurality of planetary gearsets 42A, 42B. The motors 30A, 30B are operatively connected to the gearsets 42A, 42B in a manner similar to that described in the aforereferenced patents.

The transmission housing 14 includes a wall 46 extending radially-inwardly toward the transmission centerline 50 from the inner surface 22. The wall 46 separates the stator 34A of the first motor 30A from the stator 34B of the second motor 30B, and includes a formation 54 for receiving threaded fasteners 58. A member 62A is affixed to the wall 46 at the formation 54 by threaded fastener 58. The member 62A includes a generally cylindrical portion 66A that circumscribes at least part of stator 34A, and cooperates with the housing 14 to form an annular coolant flowpath 70A therebetween. The annular coolant flowpath 70A is in fluid communication with a source of pressurized fluid coolant. The member 62A defines a plurality of holes 74 sufficiently positioned to direct coolant from the annular coolant flowpath 70A radially inward toward the stator 34A. O-rings or other seals 78 are employed between the member 62A and the housing 14 to seal the annular flowpath 70A.

A similar member 62B is mounted to the wall 46 at the formation 54 by a threaded fastener 58 to circumscribe at least a portion of stator 34B with a generally cylindrical portion 66B. Member 62B also cooperates with the housing 14 to form an annular flowpath 70B, and includes holes 74 formed therein to direct coolant from the flowpath 70B radially inward toward the stator 34B. Support members 82 are affixed to the wall 46 by fasteners 58 to rotatably support rotors 38A, 38B at bearings 86. The stators 34A, 34B are preferably staked to the members 62A, 62B. The members 62A, 62B are preferably sized to maintain a light press on the stators.

Figure 2:
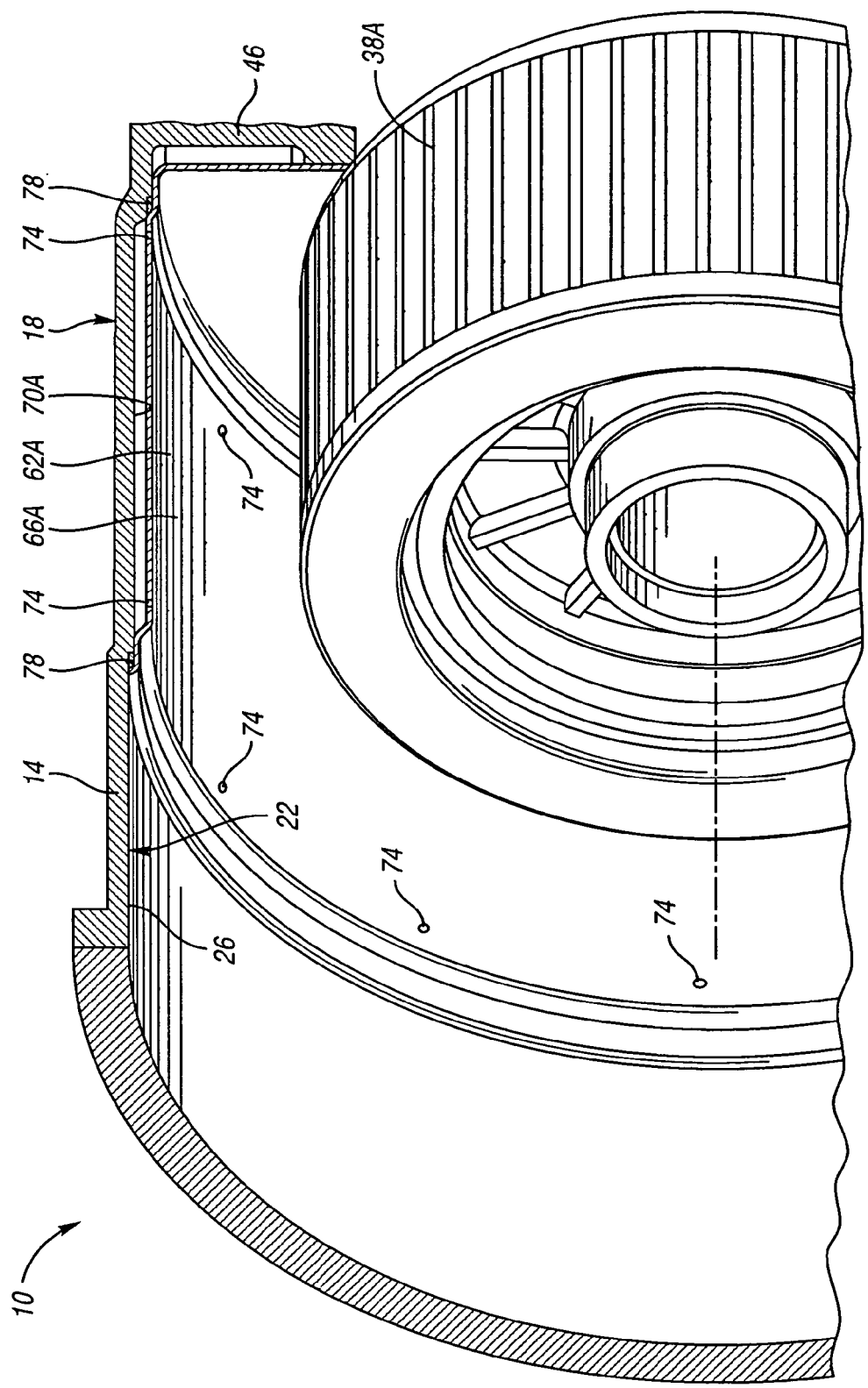
FIG. 2 is a schematic perspective view of the transmission portion of FIG. 1.

FIG. 2, wherein like reference numbers refer to like components from FIG. 1, is a schematic perspective illustration of a portion of housing 14 and member 62A. Only a portion of the rotor 38A of motor 30A is depicted in FIG. 2.

Figure 3:
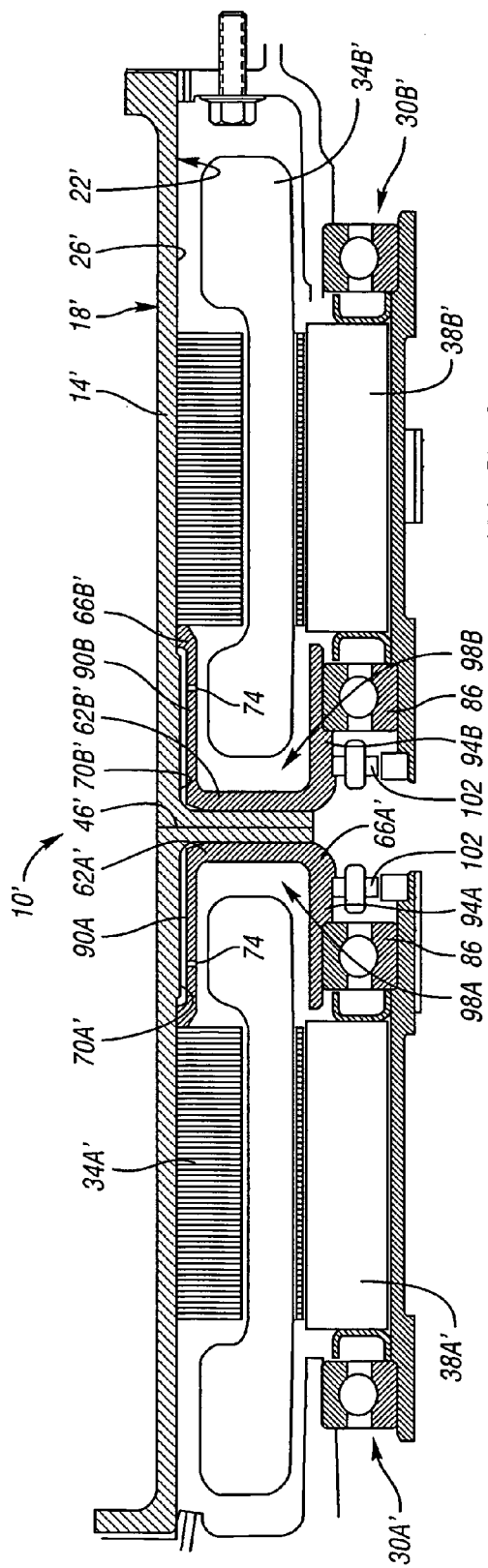
FIG. 3 is a schematic cross-sectional side view of an alternative transmission configuration according to the claimed invention.

Referring to FIG. 3, wherein like reference numbers refer to like components from FIGS. 1 and 2, an alternative transmission 10' and member configuration is schematically depicted. Members 62A', 62B' are each attached to opposite sides of housing wall 46', such as by threaded fastener, rivet, physical part interference caused by the stators 34A', 34B', etc.

Members 62A', 62B' each include respective outer walls 90A, 90B that cooperate with the housing 14' to form annular flowpaths 70A', 70B'. The members 62A', 62B' also include respective inner walls 94A, 94B. Inner wall 94A is positioned with respect to the outer wall 90A such that an open space 98A is formed therebetween that contains a portion of stator 34A'. Similarly, inner wall 94B is positioned with respect to outer wall 90B such that an open space 98B is formed therebetween that contains a portion of stator 34B'. Inner walls 94A, 94B each have a bearing 86 mounted thereto to rotatably support rotors 38A', 38B'. Inner walls 94A, 94B also support speed resolvers 102 for monitoring the speed of the rotors.

Referring to FIG. 4, wherein like reference numbers refer to like components from FIGS. 1-3, another alternative transmission 10" configuration is schematically depicted. The transmission 10" includes a preassembled module 106 that includes member 110 and two motors 30A", 30B", of which only the respective stators 34A", 34B" are depicted in FIG. 3. The member 110 includes an outer wall 114, the outer surface 118 of which cooperates with the housing 14" to define annular flowpaths 70A", 70B". Inner surface 122 of outer wall 114 defines a generally cylindrical space 126 in which the stators 34A", 34B" of motors 30A", 30B" are located. Member 110 also includes wall 130 that extends radially inward from inner surface 122. Inner wall 134 extends axially from wall 130, and is spaced a distance from outer wall 114. A portion of stator 34A" is between the outer wall 114 and inner wall 134. A portion of stator 34B" is between the outer wall 114 and inner wall 134. Bearings 86 are attached to inner wall 134 to rotatably support the rotors of motors 30A", 30B". Speed resolvers 102 are also affixed to the inner wall 134. Hole 138 is formed in wall 130 through which wiring 142 for speed resolvers extend. Member 110 is preferably steel to prevent thermal clearance changes, to allow standard clearance bearings, and to provide electromagnetic shielding for the resolvers and wires.

Figure 5:
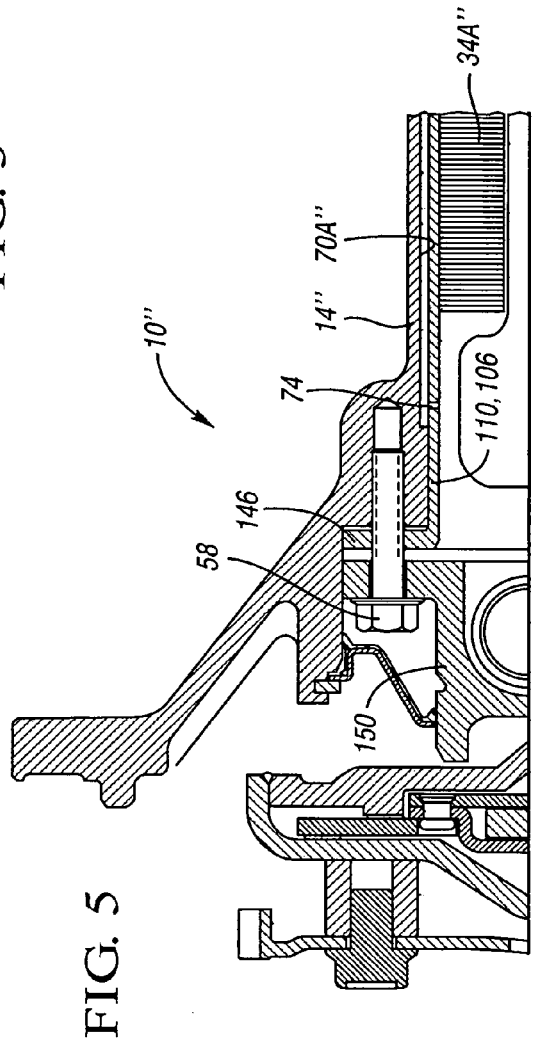
FIG. 5 is a schematic cross-sectional side view of a portion of the transmission of FIG. 4.

Referring to FIG. 5, wherein like reference numbers refer to like components from FIGS. 1-4, the member 110 of module 106 preferably includes a flange 146. The member 110 is mountable to the housing 14" at the flange 146 using the same bolt 58 that is used to connect the transmission front transmission support assembly 150.

Commonly-assigned U.S. Patent Application Ser. Nos. 60/555,141, filed Mar. 22, 2004, and 60/555,270, filed Mar. 22, 2004, are hereby incorporated by reference in their entireties.

While the best modes for carrying out the invention have been described in detail, those familiar with the art to which this invention relates will recognize various alternative designs and embodiments for practicing the invention within the scope of the appended claims.

The invention claimed is:

1. A hybrid transmission comprising:
   a transmission housing defining a generally cylindrical cavity and having a wall portion extending radially-inwardly toward a centerline of the housing;
   a first electric motor including a first stator and a first rotor;
   a second electric motor including a second stator and a second rotor:
   a first member separate from said transmission housing having a generally cylindrical portion that circumscribes at least part of said first stator and that is operatively connected to said first stator and to a first axially outer surface of said wall portion, to thereby form a first preassembled module adapted for installation within said cylindrical cavity; and
   a second member separate from said transmission housing having a generally cylindrical portion that circumscribes at least part of said second stator and that is operatively connected to said second stator and to a second axially outer surface of said wall portion, to thereby form a second preassembled module adapted for installation within said cylindrical cavity;
   wherein said first member and said second member each cooperate with said transmission housing once installed within said cylindrical cavity to form at least one annular coolant flowpath therebetween, said at least one annular flow path circumscribing said first stator and said second stator, and said member defining a plurality of holes sufficiently positioned to direct coolant from said at least one annular coolant flowpath radially inward toward said first stator and said second stator.

2. The transmission of claim 1, wherein at least one of said first member and said second member is steel.

3. The transmission of claim 1, wherein at least one of said first rotor and said second rotor is rotatable on a bearing, and wherein said bearing is supported by said member.

4. The transmission of claim 1, wherein the transmission further comprises at least one speed sensor supported by said member and configured to monitor the speed of at least one of said first rotor and said second rotor.

5. A module for assembly inside a transmission housing having a centerline, the module having a wall portion extending radially-inwardly toward the centerline, the module comprising:
   a first electric motor having a first stator and a second electric motor having a second stator; and
   a member separate from said housing that circumscribes at least part of each of said first and said second stators and that defines a plurality of holes, and that is operatively attached to each of a pair of axially outer surfaces of the wall portion of the module and to each of said first and said second stators;
   wherein said member is sufficiently sized and shaped to cooperate with the transmission housing to define a first annular coolant flowpath therebetween on one side of the wall portion, said first annular coolant flowpath circumscribing at least part of said first stator, and a second annular coolant flowpath formed therebetween on the opposite side of the wall portion, said second annular coolant flowpath circumscribing at least part of said second stator, wherein at least one of said plurality of holes is sufficiently positioned with respect to said first stator to direct coolant radially inward from said first annular coolant flowpath toward said first stator in a concentrated radial spray, and wherein at least one of said plurality of holes is sufficiently positioned with respect to said second stator to direct coolant radially inward from said second annular coolant flowpath toward said second stator in a concentrated radial spray.

6. The module of claim 5, wherein said member is steel.

7. The module of claim 5, further comprising at least one speed sensor configured to monitor the speed of a rotor of at least one of said first and said second electric motors and mounted to said member.

8. A transmission comprising:
a transmission housing having a centerline and defining a generally cylindrical cavity configured for receiving a module therein;
said module including a first electric motor having a first stator and a first rotor, a second electric motor having a second stator and a second rotor,
and a member separate from said transmission housing having a generally cylindrical portion that circumscribes at least part of said first stator and part of said second stator, that cooperates with the transmission housing to form at least one annular coolant flowpath therebetween that is positioned entirely within said transmission housing, and that defines a plurality of holes sufficiently positioned to direct coolant from said at least one annular coolant flowpath radially inward toward the first and second stators; said at least one annular coolant flowpath circumscribing at least one of said first and said second stators;
wherein said member includes a solid wall portion extending radially-inward toward the centerline to thereby separate said first stator from said second stator, and further includes an inner wall portion extending radially from said solid wall portion, said inner wall portion being directly attached to at least one speed resolver for monitoring a speed of said first and said second rotors, and operatively connected to at least one bearing adapted to rotatably support said first and said second rotors.

9. The transmission of claim 8, wherein said at least one annular coolant flowpath comprises a first annular coolant flowpath circumscribing at least part of said first stator, and a second annular coolant flowpath circumscribing at least part of said second stator, said second annular coolant flowpath being separate from said first annular coolant flowpath.

* * * * *